Dec. 19, 1922.

J. C. BURLOCK.
PEDAL PAD.
FILED APR. 5, 1922.

1,439,065.

Inventor
James C. Burlock
By his Attorney
Robert W. Ashley

Patented Dec. 19, 1922.

1,439,065

UNITED STATES PATENT OFFICE.

JAMES C. BURLOCK, OF NEW YORK, N. Y.

PEDAL PAD.

Application filed April 5, 1922. Serial No. 549,691.

*To all whom it may concern:*

Be it known that I, JAMES C. BURLOCK, a citizen of the United States, and a resident of New York, in the county of New York and State of New York, have invented a new and useful Improvement in Pedal Pads, of which the following is a specification.

The invention relates to improvements in pedal pads and has particular reference to pads provided with non-skid gripping means arranged for use on the clutch and brake pedals of motor vehicles.

The object of the invention resides in the use of a separable pad mounted on the operating faces of the foot pedals of motor vehicles, which comprises a body of rubber or like material having moulded therein a mesh of coiled wire the ends of which project slightly above the surface of the rubber body to form a non-skid gripping face, to obviate the possibility of an operator's foot from slipping or sliding off the pedal during operation.

By utilizing the non-skid pad as described worn pedal surfaces may be renewed or replaced at a low cost, thereby providing means supplying many factors of use.

In the following is described in connection with the accompanying drawings, one embodiment of the invention the features thereof being more particularly pointed out hereinafter in the claims.

Figure 1:
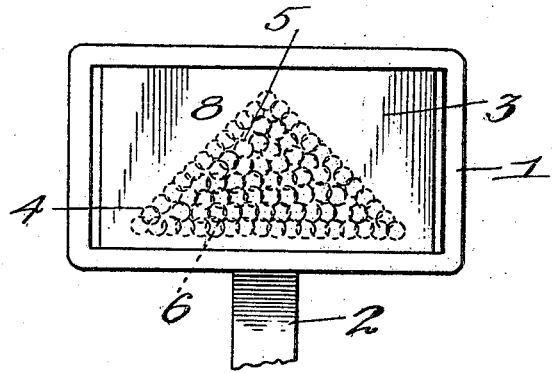
Figure 2:
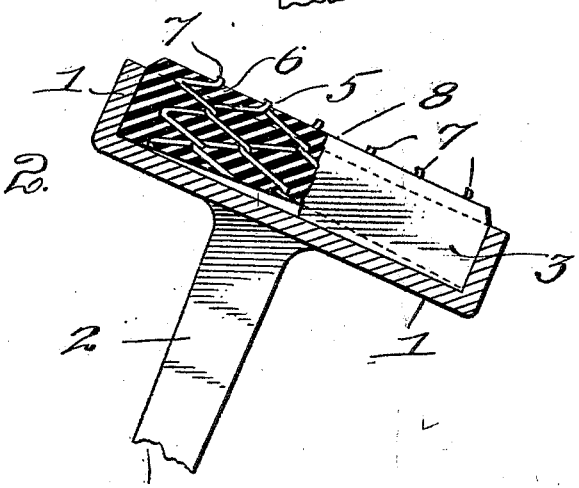
Figure 3:
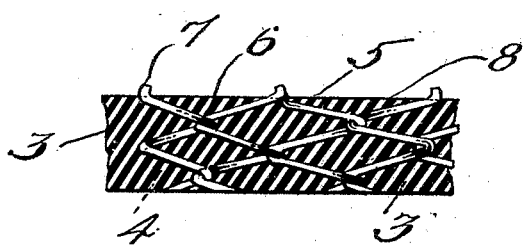

In the drawings Fig. 1 is a face elevation of the pad showing the positions therein of the non-skid insert; Fig. 2 is a cross sectional view of the pedal frame, showing the pedal pad partly in cross section and of the position therein of the non-skid insert; and Fig. 3 is an enlarged detailed sectional view of the non-skid insert.

Similar numerals of reference indicate similar parts throughout the several views.

In the drawings 1 designates a pedal frame, having formed thereon the usual type of arm 2 forming part of the clutch or brake assembly of a motor vehicle.

3 indicates a rubber body mounted in said frame 1 and has vulcanized therein a rubber insert 4 comprising a coiled wire mesh 5, the coils 6, of which are set vertically with relation to said rubber body 3 so that the ends 7 thereof project slightly beyond the operating surface 8 thereof to form a non-skid gripping surface for contact with the shoe or boot of an operator of a motor vehicle.

By constant wear of the rubber body 3 the strands of coils 6 are like-wise worn by contact and the ends thereof projecting beyond the contact surface provides a positive non-skid gripping surface to insure against the slipping therefrom of the operator's foot. Serious accidents have resulted, owing to the wearing of the operating surfaces of the pedals of motor cars, caused by wet or greased shoes or boots of the vehicle operators, and by using the invention as shown and described this fault is obviated.

The device may be made of a separable body for immediate replacement on worn pedals and other alterations may be utilized without departing from the spirit of the invention.

What I claim and desire to secure by Letters Patent of the United States, is:

1. A device of the character described including a supporting means, a resilient cushion mounted therein, and a non-skid insert forming part of said resilient cushion comprising a wire mesh the coils of which are set vertically with relation to said cushions to permit the ends of said coils in said mesh to project beyond the surface of said cushion to form a gripping engaging surface.

2. A device of the character described comprising a detachable supporting frame, a rubber cushion mounted therein, and a non-skid insert embedded in and arranged to form part of said rubber cushion, including an inter-engaging coiled wire mesh the respective coils of which extend through said rubber cushion to form a gripping retaining surface.

In witness whereof I have hereto set my hand in the presence of two subscribing witnesses.

JAMES C. BURLOCK.

Witnesses:
R. W. ASHLEY,
C. S. ASHLEY.